US012124626B2

(12) United States Patent
Torama et al.

(10) Patent No.: US 12,124,626 B2
(45) Date of Patent: Oct. 22, 2024

(54) EYE TRACKING DEVICE

(71) Applicant: Mitsubishi Electric Corporation, Tokyo (JP)

(72) Inventors: Ryosuke Torama, Tokyo (JP); Yudai Nakamura, Tokyo (JP); Daichi Tsunemichi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/567,375

(22) PCT Filed: Jun. 11, 2021

(86) PCT No.: PCT/JP2021/022230
§ 371 (c)(1),
(2) Date: Dec. 6, 2023

(87) PCT Pub. No.: WO2022/259499
PCT Pub. Date: Dec. 15, 2022

(65) Prior Publication Data
US 2024/0281059 A1    Aug. 22, 2024

(51) Int. Cl.
*G06F 3/01*    (2006.01)
*G06T 7/73*    (2017.01)
(Continued)

(52) U.S. Cl.
CPC ............ *G06F 3/013* (2013.01); *G06T 7/73* (2017.01); *G06T 17/00* (2013.01); *G06V 40/18* (2022.01);
(Continued)

(58) Field of Classification Search
CPC ......... G06F 3/013; G06V 40/18; G06T 17/00; G06T 2207/10028; G06T 2207/30201; G06T 7/73
See application file for complete search history.

(56) References Cited

U.S. PATENT DOCUMENTS

2016/0335475 A1   11/2016   Krenzer et al.
2016/0342856 A1   11/2016   Krenzer et al.
(Continued)

FOREIGN PATENT DOCUMENTS

JP    2008-102902 A    5/2008
JP       4692526 B2    6/2011
(Continued)

OTHER PUBLICATIONS

International Search Report and Written Opinion mailed on Sep. 7, 2021, received for PCT Application PCT/JP2021/022230, filed on Jun. 11, 2021, 8 pages including English Translation.

*Primary Examiner* — Priyank J Shah
(74) *Attorney, Agent, or Firm* — XSENSUS LLP

(57) ABSTRACT

An eye tracking device according to the present disclosed technology includes: an image acquiring unit that acquires an image of a subject; an arithmetic processing unit that performs image processing; and a line-of-sight angle calculating unit that calculates a line-of-sight direction vector on the basis of a result of the image processing. The arithmetic processing unit includes: a real image arithmetic processing unit that performs arithmetic processing on a real image in an image space; and a three-dimensional model superimposition processing unit that performs superimposition processing on the image space using a three-dimensional face model. The three-dimensional model superimposition processing unit includes a three-dimensional model correcting unit that corrects the three-dimensional face model in order to eliminate an error caused by the superimposition processing.

1 Claim, 10 Drawing Sheets

(51) Int. Cl.
G06T 17/00 (2006.01)
G06V 40/18 (2022.01)

(52) U.S. Cl.
CPC .............. *G06T 2207/10028* (2013.01); *G06T 2207/30201* (2013.01)

(56) References Cited

U.S. PATENT DOCUMENTS

2017/0032214 A1   2/2017  Krenzer et al.
2017/0083087 A1*  3/2017  Plummer ............. G06V 20/597
2019/0156100 A1   5/2019  Rougeaux et al.

FOREIGN PATENT DOCUMENTS

JP        2017-514193 A    6/2017
JP        2019-519859 A    7/2019

\* cited by examiner

FIG. 6

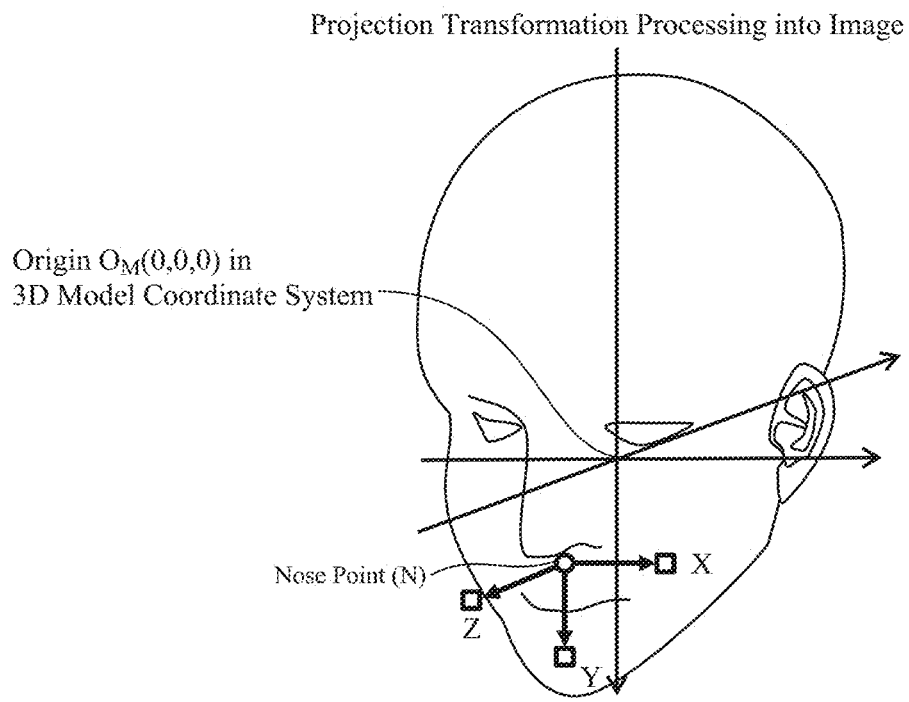

| Position Coordinates in 3D Model Coordinate System |
| --- |
| (Examples of Unit Vector Projection Transformation) |
| Start Point Coordinates of Unit Vector in Three Axis Directions $N(N_x, N_y, N_z)$ |
| End Point Coordinates of Unit Vector in X Direction $X(N_x + 1, N_y, N_z)$ |
| End Point Coordinates of Unit Vector in Y Direction $Y(N_x, N_y + 1, N_z)$ |
| End Point Coordinates of Unit Vector in Z Direction $Z(N_x, N_y, N_z - 1)$ |

※ Start Point and End Point of Any Vector Can Be Projection-Transformed into Image FIG. 10
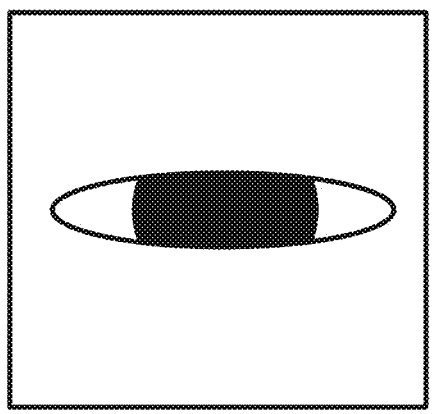
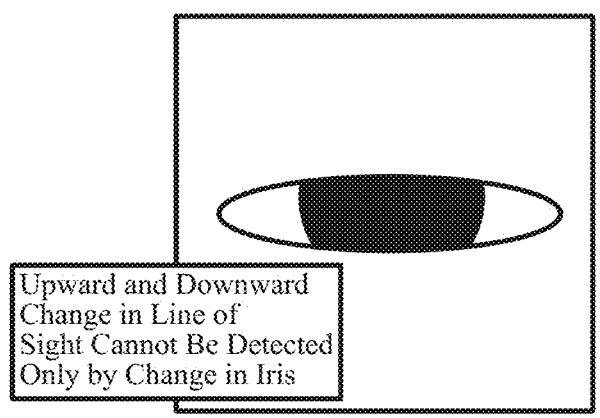
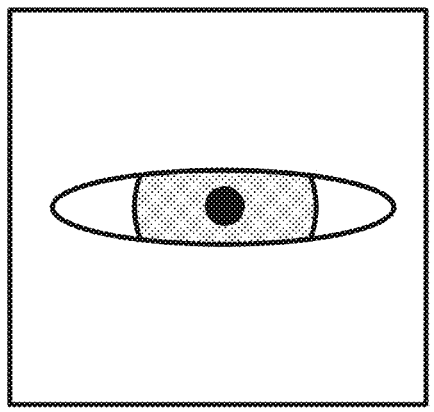
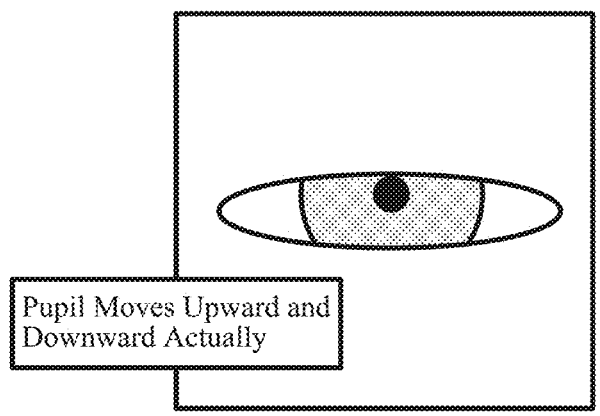

EYE TRACKING DEVICE

CROSS-REFERENCE TO RELATED APPLICATION

This application is a national stage application of International Patent Application No. PCT/JP2021/022230, filed Jun. 11, 2021, the entire contents of which are incorporated herein by reference.

TECHNICAL FIELD

The present disclosed technology relates to an eye tracking device.

BACKGROUND ART

A line-of-sight direction estimating device that tracks a line of sight in real time on the basis of image information captured by one camera is disclosed (for example, Patent Literature 1). The line-of-sight direction estimating device according to Patent Literature 1 estimates a human eyeball center position on the basis of a relative change in a specified position and posture of a face, extracts an iris in an image region, extracts an iris center position, and estimates a line-of-sight direction on the basis of the extracted iris center position and the estimated eyeball center position.

The line-of-sight direction estimating device according to Patent Literature 1 uses two or more image frame sequences obtained by a user changing a direction of his or her face while gazing at a camera in initial calibration. A conventional line-of-sight direction estimating device exemplified in Patent Literature 1 extracts and tracks a facial feature point and an iris center from the image frame sequences, and models a relative relationship between the facial feature point and an eyeball center.

CITATION LIST

Patent Literature

Patent Literature 1: JP 2008-102902 A

SUMMARY OF INVENTION

Technical Problem

An image frame preparing operation in which a user changes a direction of his or her face while gazing at a camera, although only at the time of initial calibration, imposes a burden on the user. In the present technical field, there is a demand for a device that reduces a burden on a user as much as possible. An object of the present disclosed technology is to solve the above problem and provide an eye tracking device that does not require an image frame preparing operation.

Solution to Problem

An eye tracking device (eye tracker) according to the present disclosed technology includes: an image acquiring unit (image acquirer) that acquires an image of a subject; an arithmetic processing unit (arithmetic processor) that performs image processing; and a line-of-sight angle calculating unit (line-of-sight angle calculator) that calculates a line-of-sight direction vector on the basis of a result of the image processing. The arithmetic processing unit (arithmetic processor) includes: a real image arithmetic processing unit (real image arithmetic processor) that performs arithmetic processing on a real image in an image space; and a three-dimensional model superimposition processing unit (three-dimensional model superimposition processor) that performs superimposition processing on the image space using a three-dimensional face model. The three-dimensional model superimposition processing unit (three-dimensional model superimposition processor) includes an eyeball position correcting unit (eyeball position corrector) to estimate a direction of the pupil by referring to a distance from a nose point N to a pupil.

The eyeball position correcting unit (eyeball position corrector) performs the following processes.
- (processing A) coordinate-transforms a plurality of reference points defined on the three-dimensional face model to an image coordinate system.
- (processing B) corrects the position of a point A, which is one of the reference points, and defines a point A'.
- (processing C) decomposes a vector NA' connecting the nose point N and the defined point A' in an X-axis direction and a Y-axis direction.
- (processing D) calculates a distance from the nose point N to the pupil position by referring to the decomposed Y-axis direction component of the vector NA', wherein, the X-axis direction in the image coordinate system is generally horizontal, and the Y-axis direction in the image coordinate system is generally vertical.

Advantageous Effects of Invention

The eye tracking device according to the present disclosed technology has the above configuration, and therefore can detect a line-of-sight direction without requiring an image frame preparing operation.

BRIEF DESCRIPTION OF DRAWINGS

FIG. 6 is a third reference diagram illustrating the processing step of the eye tracking device according to the second embodiment.

FIG. 10 is a reference diagram illustrating an effect of the eye tracking device according to the second embodiment.

DESCRIPTION OF EMBODIMENTS

The eye tracking device 1 according to the present disclosed technology will be apparent from the following description with reference to the drawings for each embodiment.

First Embodiment

Figure 1:
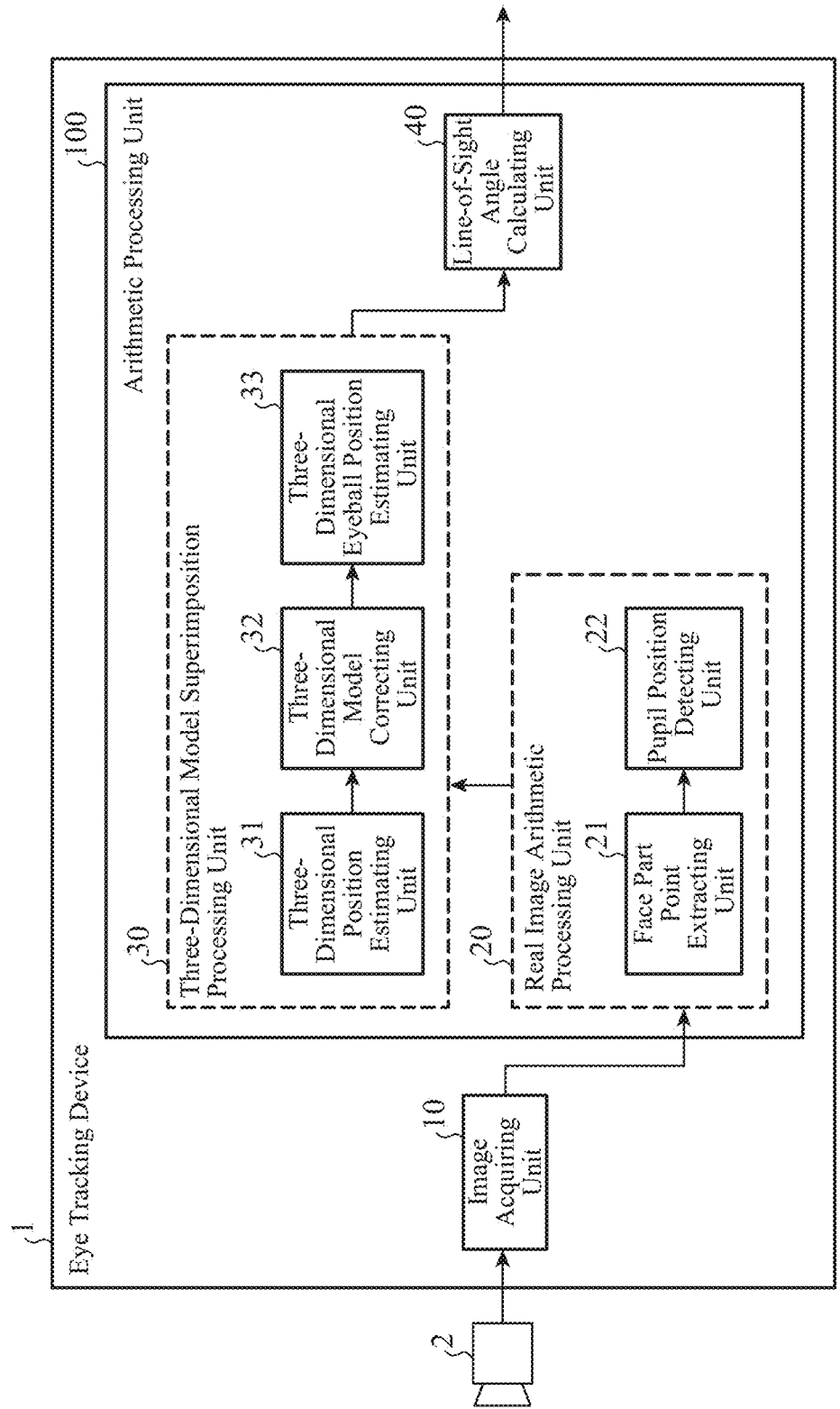
FIG. 1 is a block diagram illustrating a functional configuration of an eye tracking device according to a first embodiment.

FIG. 1 is a block diagram illustrating a functional configuration of an eye tracking device 1 according to a first embodiment. As illustrated in FIG. 1, the eye tracking device 1 according to the first embodiment includes an image acquiring unit 10 and an arithmetic processing unit 100. The arithmetic processing unit 100 performs image processing. The arithmetic processing unit 100 includes a real image arithmetic processing unit 20, a three-dimensional model superimposition processing unit 30, and a line-of-sight angle calculating unit 40. Furthermore, the real image arithmetic processing unit 20 includes a face part point extracting unit 21 and a pupil position detecting unit 22. The three-dimensional model superimposition processing unit 30 includes a three-dimensional position and posture estimating unit 31, a three-dimensional model correcting unit 32, and a three-dimensional eyeball position estimating unit 33.

Figure 2:
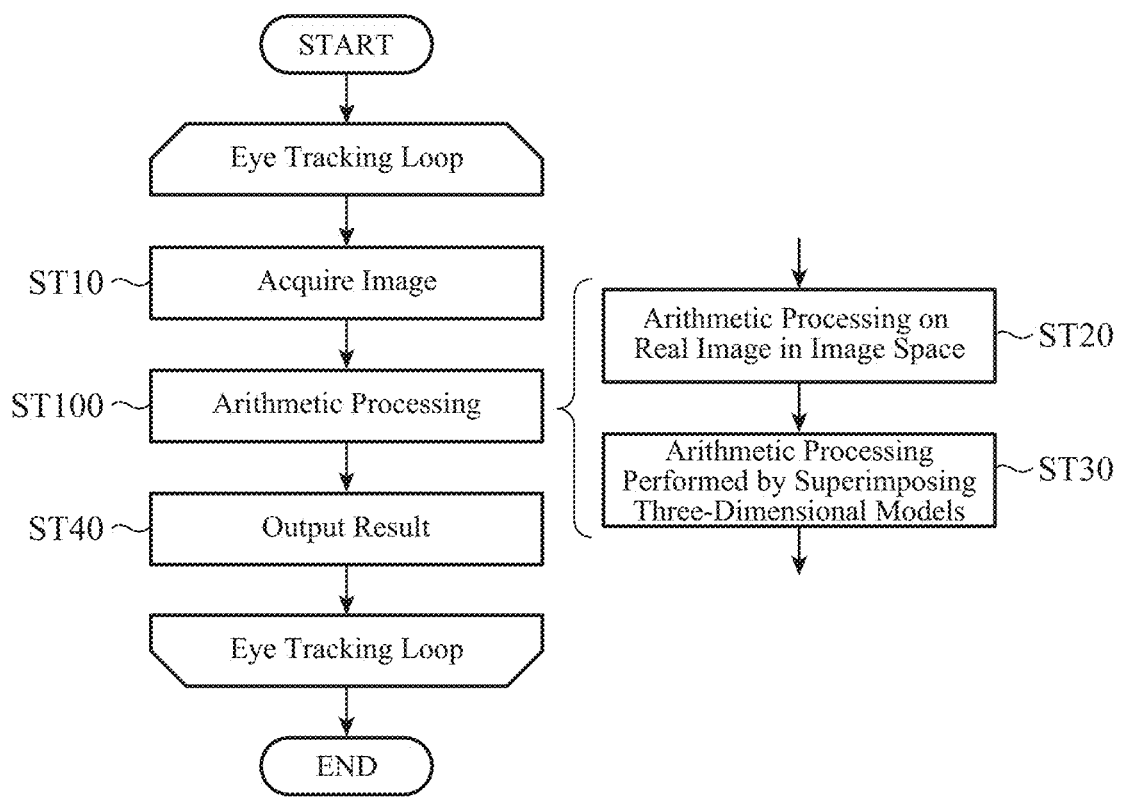
FIG. 2 is a flowchart illustrating a processing flow of the eye tracking device according to the first embodiment.

FIG. 2 is a flowchart illustrating a processing flow of the eye tracking device 1 according to the first embodiment. As illustrated in FIG. 2, the processing flow of the eye tracking device 1 includes a step (ST10) of acquiring an image, performed by the image acquiring unit 10, an arithmetic processing step (ST100) performed by the arithmetic processing unit 100, and a step (ST40) of outputting a result, performed by the line-of-sight angle calculating unit 40. The arithmetic processing step (ST100) is divided into an arithmetic processing step (ST20) for a real image, performed by the real image arithmetic processing unit 20 and a processing step (ST30) of superimposing three-dimensional models, performed by the three-dimensional model superimposition processing unit 30.

The image acquiring unit 10 acquires image data captured by a camera 2 connected to the eye tracking device 1 (step indicated by ST10 in FIG. 2). The acquired image data is output to the real image arithmetic processing unit 20.

The real image arithmetic processing unit 20 performs arithmetic processing on the output image data. More specifically, the real image arithmetic processing unit 20 performs arithmetic processing on a real image in an image space (step indicated by ST20 in FIG. 2). The real image arithmetic processing unit 20 according to the first embodiment includes the face part point extracting unit 21 and the pupil position detecting unit 22 in order from the input side.

The face part point extracting unit 21 first performs face detection from the output image data. For the face detection, an existing machine learning method may be used. For the face detection in the eye tracking device 1 according to the present disclosed technology, for example, a method using a Haar-Like feature and AdaBoost may be used.

Next, the face part point extracting unit 21 extracts a face part. Here, the face part refers to a part point that is a feature of a face such as the outer corner of an eye, the inner corner of an eye, the tip of a nose, or the corner of a mouth. For the face part extraction, an existing machine learning method may be used. For the face part extraction in the eye tracking device 1 according to the present disclosed technology, for example, a method using random forest using a HOG feature amount may be used.

The pupil position detecting unit 22 may determine an eye region using information of the outer corner of the eye and the inner corner of the eye among the face parts extracted by the face part point extracting unit 21, and perform image recognition in a spot manner in the determined eye region. The pupil center detection only needs to be performed on the basis of information of the contour of a pupil, and for example, may be performed by obtaining the center of a pupil circle using Huff Transform.

The eye tracking device 1 according to the present disclosed technology includes a three-dimensional face model in the three-dimensional model superimposition processing unit 30 of the arithmetic processing unit 100. That is, the three-dimensional model superimposition processing unit 30 performs a processing step (ST30) of superimposing three-dimensional models using the three-dimensional face model. The three-dimensional model superimposition processing unit 30 attempts to construct plausible three-dimensional information on the basis of real image information obtained from the real image arithmetic processing unit 20. The three-dimensional model superimposition processing unit 30 according to the first embodiment includes the three-dimensional position and posture estimating unit 31, the three-dimensional model correcting unit 32, and the three-dimensional eyeball position estimating unit 33 in order from the input side.

The three-dimensional position and posture estimating unit 31 calculates a face direction on the basis of a face part extraction result obtained from the face part point extracting unit 21 of the real image arithmetic processing unit 20. The three-dimensional position and posture estimating unit 31 rotationally translates the three-dimensional face model in a virtual three-dimensional space in such a manner that an extracted face part point coincides with a face part point on the three-dimensional face model. The virtual three-dimensional space is a space on a computer that simulates a real three-dimensional space. As the real three-dimensional space is transformed to a two-dimensional image plane by the camera 2, the virtual three-dimensional space can also be transformed to a two-dimensional image plane.

In an operation of causing the extracted face part point to coincide with the face part point on the three-dimensional face model, for example, an operation in which a sum of square errors between positions of the extracted face part points and positions of the face part points on the three-dimensional face model on an image plane is minimized may be used as a solution.

The position and the direction of the three-dimensional face model obtained as a solution are output as a face direction estimation result. Specifically, position coordinates and a posture matrix of the three-dimensional face model in an imaginary three-dimensional space are output as the face direction estimation result. The position coordinates of the three-dimensional face model may be defined, for example, as coordinates using the midpoint between the eyeball center of the right eye of the three-dimensional face model and the eyeball center of the left eye thereof as a representative point. The posture matrix of the three-dimensional face model may be any posture matrix as long as the posture matrix is defined in advance when the three-dimensional face model is created. Here, for the sake of simplicity, the posture matrix for the three-dimensional face model is determined similarly to a line-of-sight direction when a human looks forward. Specifically, the posture matrix is a matrix including three vectors indicating directions in which basis vectors in the line-of-sight direction, the left-right direction, and the up-down direction of the three-dimensional face model are directed in the three-dimensional space.

The three-dimensional model superimposition processing unit 30 of the eye tracking device 1 in the present disclosed technology may perform class classification depending on gender, age, nationality, or the like, and prepare a three-dimensional face model for each class. The eye tracking device 1 may be able to select which class of three-dimensional face model to use. In addition, a plurality of three-dimensional face models may be used in a face direction calculating step, and a three-dimensional face model having a minimum sum of the square errors of the positions may be selected from the plurality of three-dimensional face models.

After the processing step of estimating a position and a posture by the three-dimensional position and posture estimating unit 31, the eye tracking device 1 according to the present disclosed technology corrects the three-dimensional face model in order to eliminate an error caused by the coinciding operation on the image plane. The three-dimensional face model is corrected in the three-dimensional model correcting unit 32. Here, the correction of the three-dimensional face model is deformation of the three-dimensional face model, for example, moving the position of an eyeball itself in the three-dimensional face model in such a way as to reduce an error. With this processing step, the eye tracking device 1 according to the present disclosed technology does not require initial calibration, and does not require an image frame preparing operation required in prior art.

The three-dimensional eyeball position estimating unit 33 calculates the coordinates of an eyeball center position in the three-dimensional space using the face direction estimation result obtained by the three-dimensional position and posture estimating unit 31 and the information of the corrected three-dimensional face model. Here, in the three-dimensional face model used in the present disclosed technology, the relative position of the eyeball center is defined in advance. In addition, it is assumed that a human eyeball center position captured by the camera 2 does not change even when only the eyeball is moved in such a way as to change a line-of-sight direction. As a result, the eye tracking device 1 according to the present disclosed technology can easily calculate the coordinates of the eyeball center position (hereinafter, referred to as "eyeball center coordinates") in the three-dimensional space from the definition information of the three-dimensional face model and the face direction estimation result obtained by the three-dimensional position and posture estimating unit 31, that is, the position and posture information.

In the eye tracking device 1 according to the present disclosed technology, it is assumed that a pupil is on a surface of a sphere called an eyeball (first assumption). The size of the eyeball considered here is assumed to be average (second assumption), and the eyeball of the three-dimensional face model is defined. In each of a right eye and a left eye, it is assumed that an eyeball center and a pupil center are separated from each other by a constant distance at all times (third assumption). That is, this constant distance is an eyeball radius r. The first to third assumptions are assumptions related to the three-dimensional face model included in the three-dimensional model superimposition processing unit 30. The three-dimensional model superimposition processing unit 30 of the arithmetic processing unit 100 calculates the coordinates of a pupil center position (hereinafter, referred to as "pupil center coordinates") in the three-dimensional space from the eyeball center position obtained by the three-dimensional eyeball position estimating unit 33 on the assumption regarding the three-dimensional face model.

Calculating the pupil center coordinates in the three-dimensional space results in a problem of obtaining an intersection between a straight line and a sphere in the three-dimensional space. In general, when a straight line and a sphere intersect with each other, there are at most two intersections. The pupil is on a side visible from the camera 2, and therefore a point close to the camera 2 out of the two obtained intersections only needs to be recognized as a pupil center.

The line-of-sight angle calculating unit 40 calculates a line-of-sight direction vector on the basis of the eyeball center position and the pupil center position calculated by the three-dimensional model superimposition processing unit 30. Specifically, the line-of-sight angle calculating unit 40 calculates a vector connecting the eyeball center position and the pupil center position in the three-dimensional space as a line-of-sight direction vector. The line-of-sight direction vector is calculated for each of a right eye and a left eye. The eye tracking device 1 according to the present disclosed technology may register a right eye or a left eye in advance as a "dominant eye" and output a line-of-sight direction vector for the dominant eye. Alternatively, the eye tracking device 1 according to the present disclosed technology may calculate an intersection between a line of sight of a right eye and a line of sight of a left eye, and output, as a line-of-sight direction vector, a vector starting from the midpoint between the eyeball center position of the right eye and the eyeball center position of the left eye and ending at the intersection. Even when the line of sight of the right eye and the line of sight of the left eye do not intersect with each other, a line-of-sight direction vector for the dominant eye may be output.

The eye tracking device 1 according to the first embodiment has the above configuration as described above, and therefore does not require initial calibration and can detect a line-of-sight direction without requiring an image frame preparing operation of a user.

Second Embodiment

Figure 3:
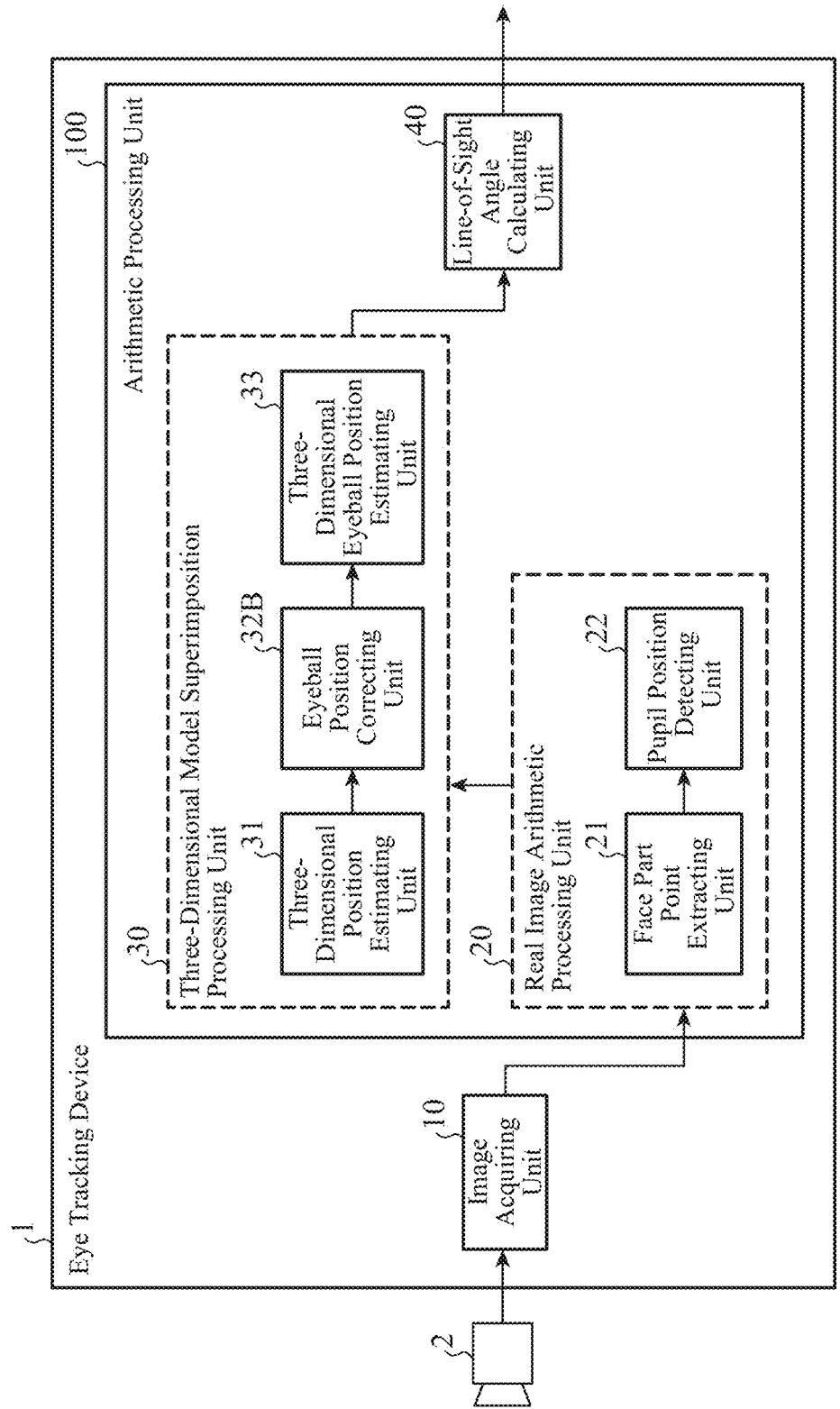
FIG. 3 is a block diagram illustrating a functional configuration of an eye tracking device according to a second embodiment.

FIG. 3 is a block diagram illustrating a functional configuration of an eye tracking device 1 according to a second embodiment. As illustrated in FIG. 3, the eye tracking device 1 according to the second embodiment includes an eyeball position correcting unit 32B instead of the three-dimensional model correcting unit 32 of the first embodiment. Here, the same reference numerals as those used in the first embodiment are used unless otherwise specified. In addition, description overlapping with the first embodiment will be appropriately omitted.

Specifically, a processing step performed by the eyeball position correcting unit 32B is a processing step of correcting an eyeball center position in a 3D model coordinate system. A correction amount used for this correction may be calculated on the basis of, for example, a distance from a specific point regarding a nose to a specific point regarding a pupil on an image. The specific point regarding the nose (hereinafter referred to as "nose point") may be, for example, a midpoint of nostrils or a subnasal. The nose point is an easily specified place in a face, and therefore the nose point is used as one of reference points in the eye tracking device 1 according to the second embodiment.

A premise adopted by the eye tracking device 1 according to the second embodiment is that actual dimensions of a human face do not differ so much from each other. Therefore, when a Y-axis component of a distance from a nose point to a pupil is found, a direction of the pupil can be found. Specifically, when the Y-axis component of the distance from the nose point to the pupil is larger than that of the three-dimensional face model, it is considered that a subject that appears in the image has his or her pupil upward. When the Y-axis component of the distance from the nose point to the pupil is smaller than that of the three-dimensional face model, it is considered that a subject that appears in the image has his or her pupil downward.

Figure 4:
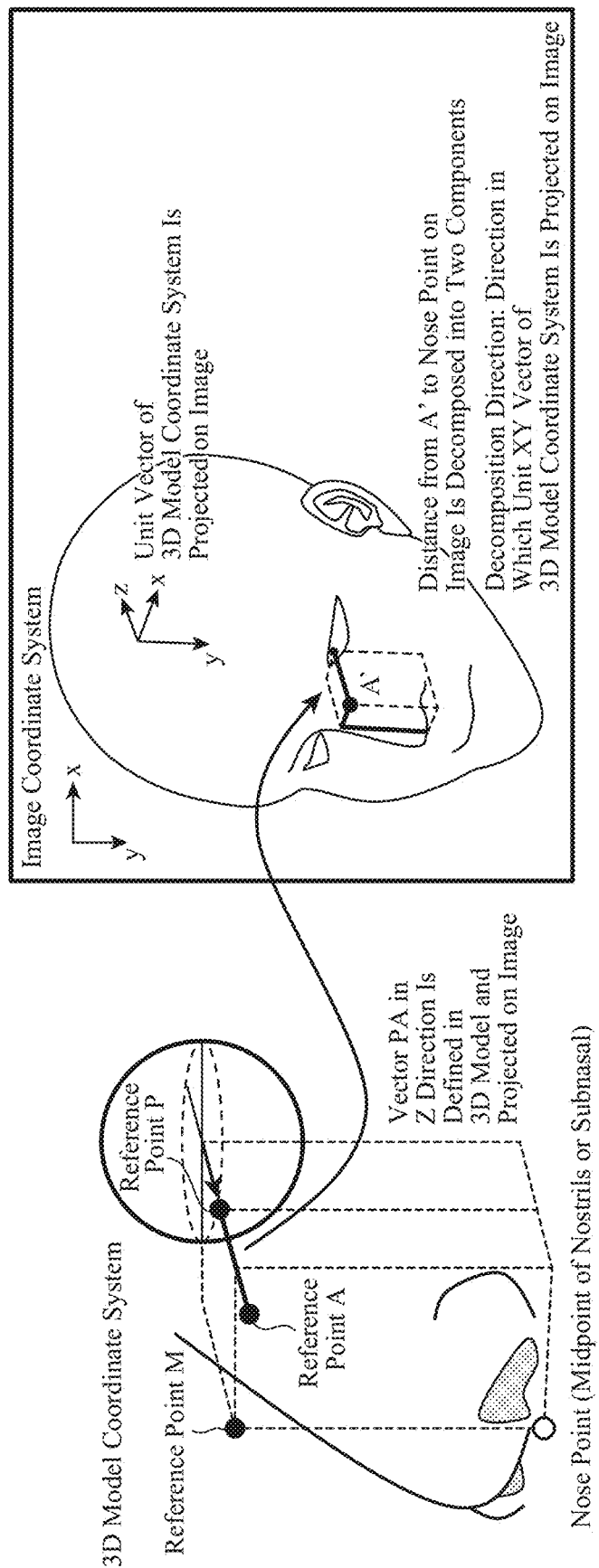
FIG. 4 is a first reference diagram illustrating a processing step of the eye tracking device according to the second embodiment.

FIG. 4 is a first reference diagram illustrating a processing step of the eye tracking device 1 according to the second embodiment. Calculation of a correction amount used in processing of correcting an eyeball center position in the 3D model coordinate system is clear from the example illustrated in FIG. 4.

The example of the processing of correcting the eyeball center position can be divided into more detailed processing steps. The example of the processing of correcting the eyeball center position includes: a step (processing A) of coordinate-transforming a plurality of reference points defined on the 3D model to an image coordinate system; a step (processing B) of correcting the position of a point A, which is one of the reference points, and defines a point A'; a step (processing C) of decomposing a vector (NA') connecting a nose point and the defined point A' in an X-axis direction and a Y-axis direction; and a step (processing D) of calculating a distance from a nose point position to a pupil position on the basis of the decomposed Y-axis direction component of the vector (NA').

As the plurality of reference points defined on the 3D model, specifically, a nose point, a point M, a point A, and a point P illustrated in the 3D model coordinate system of FIG. 4 are considered.

Figure 5:
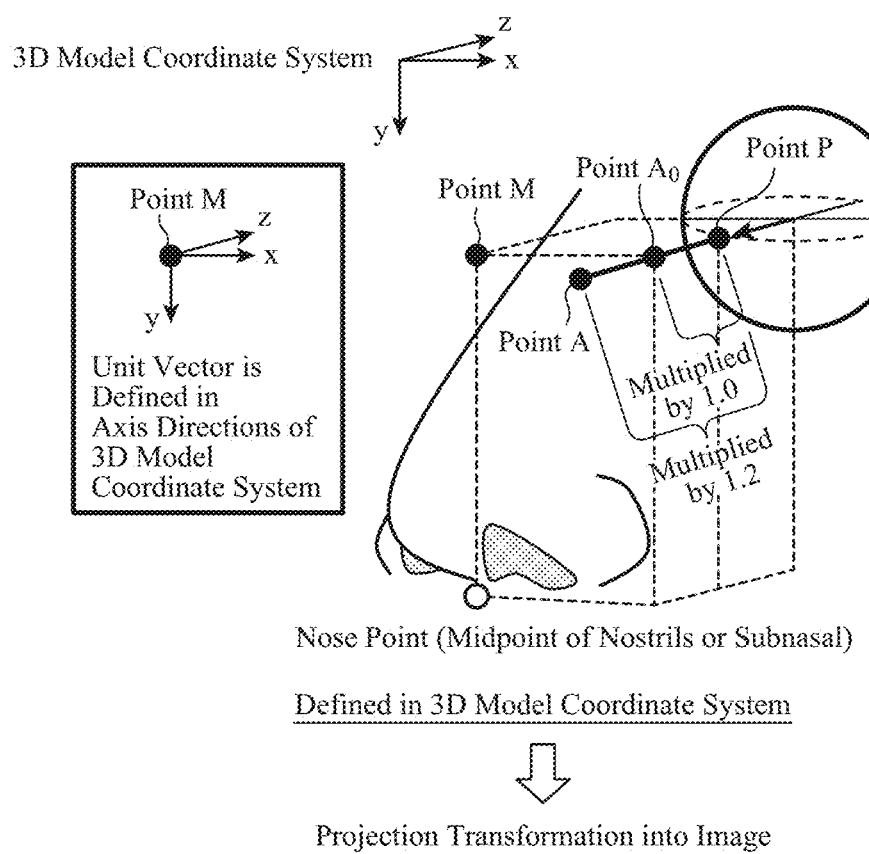
FIG. 5 is a second reference diagram illustrating the processing step of the eye tracking device according to the second embodiment.

FIG. 5 is a second reference diagram illustrating the processing step of the eye tracking device 1 according to the second embodiment. More specifically, FIG. 5 is a reference diagram illustrating a step (processing A) of coordinate-transforming a plurality of reference points defined on the 3D model to an image coordinate system.

In the 3D model coordinate system, an X axis, a Y axis, and a Z axis may be defined as illustrated in FIG. 5. Specifically, the 3D model coordinate system illustrated in FIG. 5 is a coordinate system of a right screw system in which a direction from right to left of a body is an X-axis direction, a direction from top to bottom of the body is a Y-axis direction, and a direction from front to back of the body is a Z-axis direction. The 3D model coordinate system is a coordinate system fixed to the 3D model. That is, the 3D model coordinate system is uniquely determined by the position and the posture of the 3D model regardless of the direction of gravity. The 3D model coordinate system is one of model coordinate systems, and is also referred to as a local coordinate system because the 3D model coordinate system is a coordinate system for each object.

The plurality of reference points defined on the 3D model as illustrated in FIG. 5 may be defined as follows, for example.

The point P, which is one of the reference points, may be defined as a point obtained by moving an eyeball center in a minus Z direction by the radius of an eyeball, for example. A statistically obtained value may be used as the radius of the eyeball. Here, the radius of the eyeball is, for example, 10.00 [mm].

A point $A_0$, which is one of the reference points, may be defined as a point obtained by moving the point P only in the minus Z direction and having the same Z coordinate as the nose point.

The point A, which is one of the reference points, may be defined as a point located at an end point of a direction vector starting from the point P and obtained by multiplying a vector $PA_0$ by 1.2. The point A has the same XY coordinates as the point P and the point $A_0$. Note that, here, the example in which the vector $PA_0$ is multiplied by 1.2 is illustrated, but the present disclosed technology is not intended to be limited thereto.

The point M, which is one of the reference points, may be defined as a point obtained by moving the point $A_0$ only in the X direction and having the same X coordinate as the nose point. Note that FIG. 6 is an example in a left eye, and the point M is located in a minus X direction with respect to the point $A_0$. Conversely, in a case of a right eye, the point M is located in a plus X direction with respect to the point $A_0$.

FIG. 6 is a third reference diagram illustrating the processing step of the eye tracking device 1 according to the second embodiment. More specifically, FIG. 7 is a second reference diagram illustrating a step (processing A) of coordinate-transforming a plurality of reference points defined on the 3D model to an image coordinate system.

It is easy to understand a method for performing transformation from the 3D model coordinate system to the image coordinate system via a camera coordinate system. The camera coordinate system is also referred to as a view coordinate system. Transformation from the model coordinate system (N, X, Y, Z) to the camera coordinate system (N', X', Y', Z') is implemented by multiplication by a 4×4 matrix. Transformation from the camera coordinate system to the image coordinate system also results in multiplication by a matrix.

Figure 7:
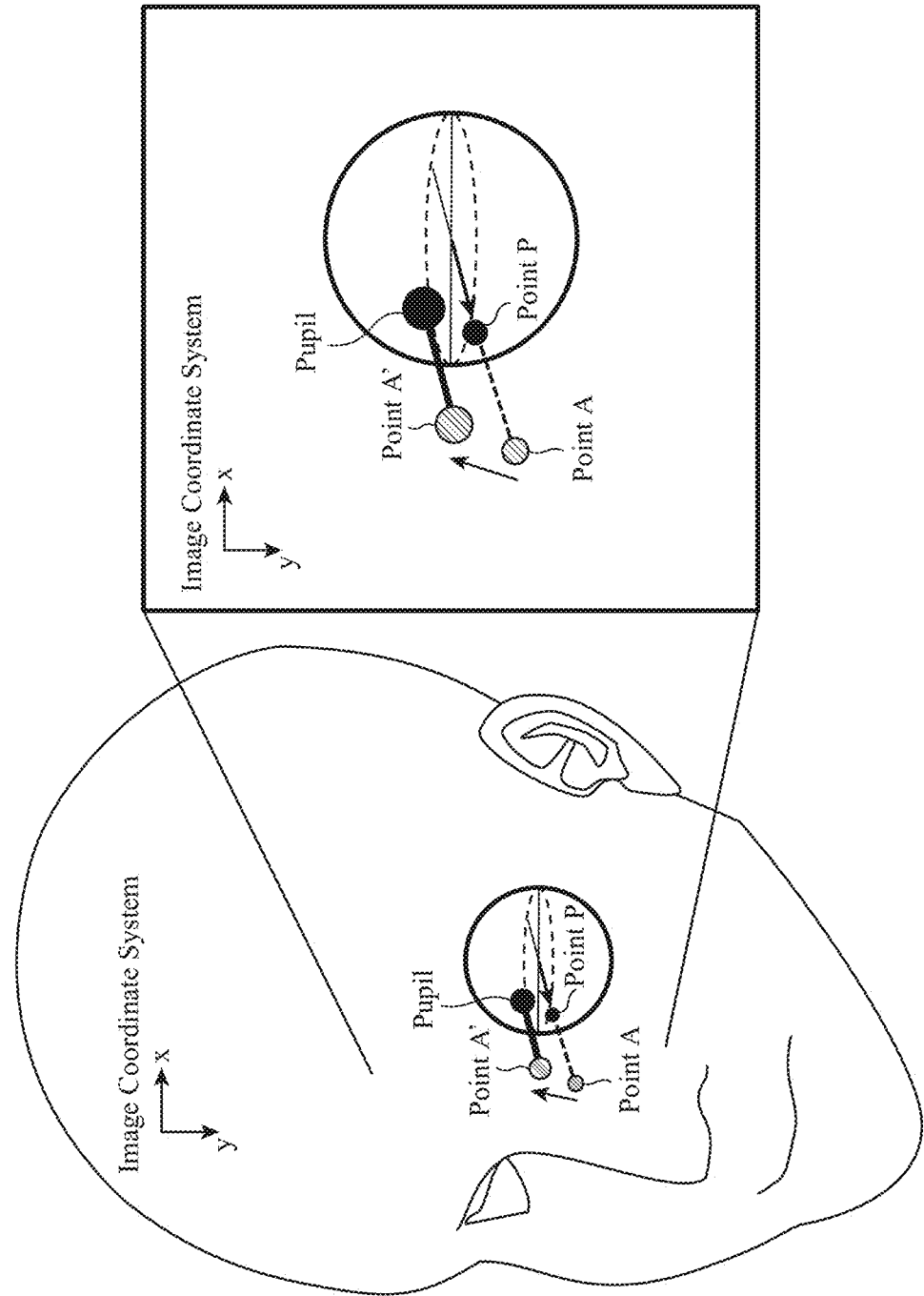
FIG. 7 is a fourth reference diagram illustrating the processing step of the eye tracking device according to the second embodiment.

FIG. 7 is a fourth reference diagram illustrating the processing step of the eye tracking device 1 according to the second embodiment. More specifically, FIG. 7 is a reference diagram illustrating a step (processing B) of correcting the position of a point A, which is one of the reference points, and defining a point A'. The point A' is a point obtained by correcting the position of the point A on the basis of image data information captured by the camera 2, in particular, on the basis of information as to where a pupil appears. The processing of correcting the position of the point A performed by the eyeball position correcting unit 32B is performed in a plane of the image coordinate system. It may be considered that the image captured by the camera 2 and the plurality of reference points transformed to the image coordinate system by the coordinate transformation are superimposed on the plane of the image coordinate system.

As illustrated in FIG. 7, in the processing of correcting the position of the point A, first, a vector PA is considered. It should be noted that the point P is a point obtained by moving the eyeball center in a minus Z direction by the radius of the eyeball. When the position of the pupil is at the point P, the direction of the line of sight may be a direction of the vector PA while the point P is used as a start point of the line of sight. However, when the position of the pupil that appears in the image captured by the camera 2 is different from the point P, an error occurs in the method in which the point P is used as the start point of the line of sight.

A phenomenon that the pupil and the point P of the image superimposed on the image coordinate system do not coincide with each other occurs when the 3D model does not coincide with an object actually captured by the camera 2. In particular, a living human can move his/her eyeball and move his/her line of sight up, down, left, and right while keeping a direction of his/her face unchanged. However, it is not easy to reflect also the state of the eyeball in the 3D model.

The eyeball position correcting unit 32B moves the vector PA in parallel on the plane of the image coordinate system. Specifically, the eyeball position correcting unit 32B moves the vector PA in parallel in such a manner that the start point is located at the position of the pupil that appears in the image. The point A' is an end point of the vector after the parallel movement.

Figure 8:
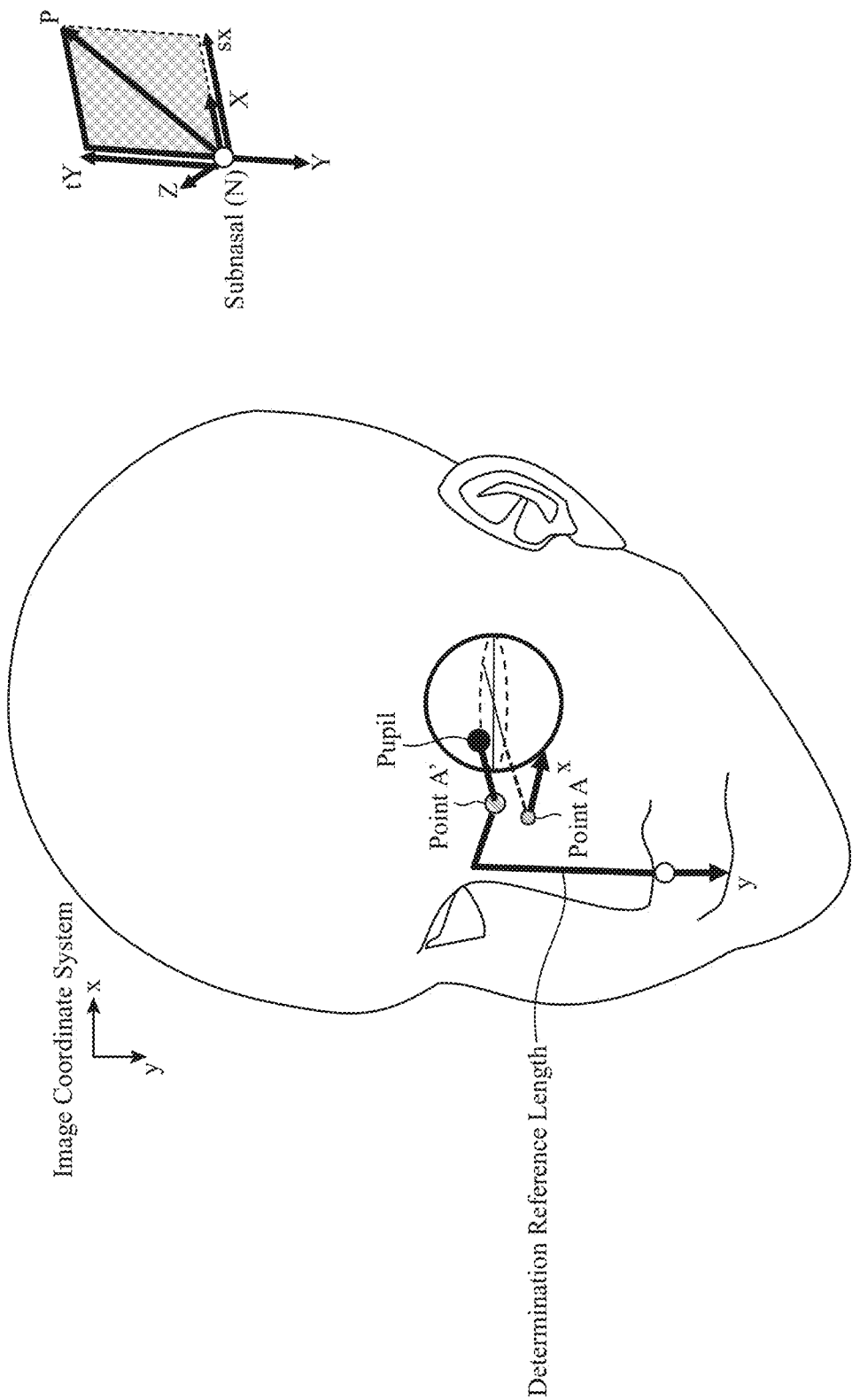
FIG. 8 is a fifth reference diagram illustrating the processing step of the eye tracking device according to the second embodiment.

FIG. 8 is a fifth reference diagram illustrating the processing step of the eye tracking device 1 according to the second embodiment. More specifically, FIG. 8 is a reference diagram illustrating a step (processing C) of decomposing the vector (NA') connecting the nose point and the defined point A' into the X-axis direction and the Y-axis direction. The eye tracking device 1 according to the second embodiment obtains a "determination reference length" illustrated in FIG. 8 and estimates a direction in which a pupil of a subject that appears in the image is directed. The determination reference length is the length of a Y-axis direction component of the vector (NA') connecting the nose point and the defined point A'.

The determination reference length can be easily obtained by using knowledge of linear algebra. Specifically, the calculation for obtaining the determination reference length may be an arithmetic operation of a vector and a matrix. This problem can be generalized as follows. In an image space represented by a two dimension (xy coordinate system), a vector NP, and an X vector and a Y vector having different directions are given (right column in FIG. 8). It is assumed that the vector NP can be expressed as follows by the XY coordinate system.

$$\overrightarrow{NP} = s\vec{X} + t\vec{Y} \quad (1)$$

$$= \begin{bmatrix} \vec{X} & \vec{Y} \end{bmatrix} \begin{bmatrix} s \\ t \end{bmatrix}$$

Here, when a transformation matrix from the image coordinate system (xy coordinate system) to the XY coordinate system is T, the following equation is satisfied.

$$\vec{T} = \begin{bmatrix} \vec{X} & \vec{Y} \end{bmatrix} \quad (2)$$

$$= \begin{bmatrix} X_x & Y_x \\ X_y & Y_y \end{bmatrix}$$

An X-coordinate component (s) and a Y-coordinate component (t) of the vector NP are expressed by the following equation.

$$\begin{bmatrix} s \\ t \end{bmatrix} = \vec{T}^{-1} \overrightarrow{NP} \quad (3)$$

$$= \frac{1}{|T|} \begin{bmatrix} Y_y & -Y_x \\ -X_y & X_x \end{bmatrix} \begin{bmatrix} \overrightarrow{NP}_x \\ \overrightarrow{NP}_y \end{bmatrix}$$

In which |T|≠0 is satisfied.

Figure 9:
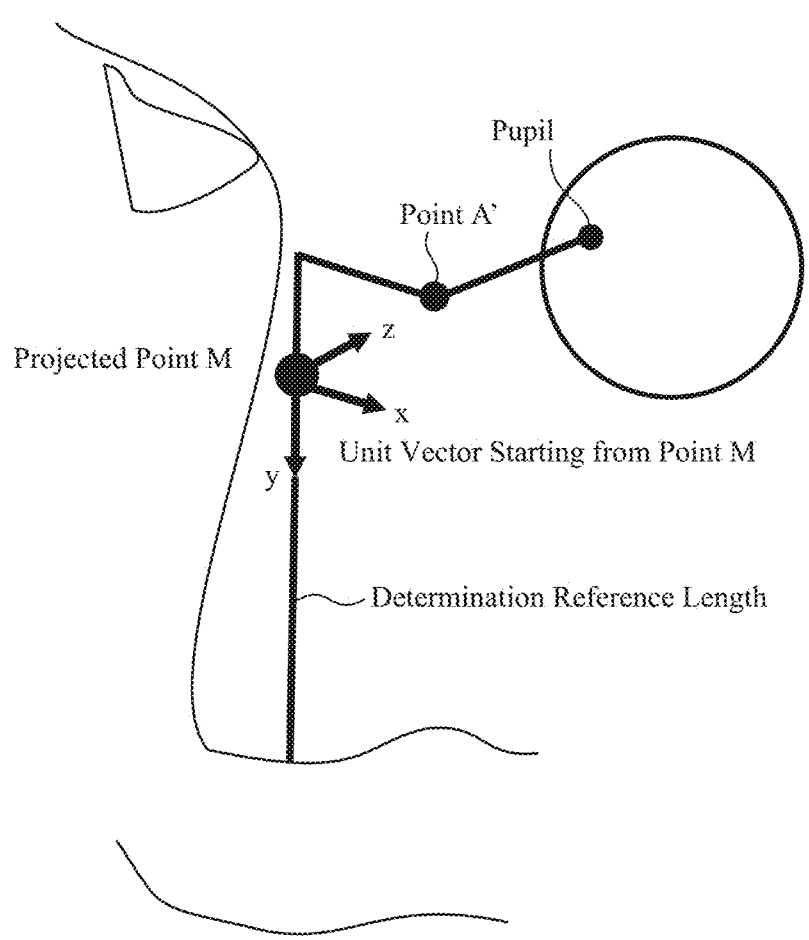
FIG. 9 is a sixth reference diagram illustrating the processing step of the eye tracking device according to the second embodiment.

FIG. 9 is a sixth reference diagram illustrating the processing step of the eye tracking device 1 according to the second embodiment. More specifically, FIG. 8 is a reference diagram illustrating a step (processing D) of calculating a distance from a nose point position to a pupil position on the basis of a decomposed Y-axis direction component of the vector (NA'). In this processing D, the point M, which is one of the reference points, is used. The point M is a point obtained by moving the point A₀ only in the X direction and having the same X coordinate as the nose point. In other words, the point M is a point having the same height (Y coordinate) as the eyeball center of the three-dimensional face model.

The eye tracking device 1 according to the second embodiment finally compares the height (Y coordinate) of the point A' with the height (Y coordinate) of the point M with the nose point as a start point. When the Y-axis direction component of the vector (NA') is larger than the Y-axis direction component of a vector (NM), it is estimated that the pupil is directed upward. Conversely, when the Y-axis direction component of the vector (NA') is smaller than the Y-axis direction component of the vector (NM), it is estimated that the pupil is directed downward.

FIG. 10 is a reference diagram illustrating an effect of the eye tracking device 1 according to the second embodiment. In the technical field to which the present disclosed technology belongs, an attempt to detect a line of sight using an iris of an eye is also conceivable. However, it is actually difficult to grasp a change when the line of sight is moved up and down only by a change in the iris. Since the eye tracking device 1 according to the second embodiment obtains a relative position of the pupil with respect to the eyeball center, it is possible to detect a direction of the pupil of the subject.

The eye tracking device 1 according to the second embodiment has the above configuration as described above, and therefore can detect a direction of a pupil of a subject and does not require initial calibration. With the configuration, the eye tracking device 1 according to the second embodiment can detect a line-of-sight direction without requiring an image frame preparing operation of a user.

INDUSTRIAL APPLICABILITY

The eye tracking device 1 according to the present disclosed technology can be applied to an in-vehicle device, a driver monitoring system (DMS), and other electric devices, and has industrial applicability.

REFERENCE SIGNS LIST

1: eye tracking device (eye tracker), 2: camera, 10: image acquiring unit (image acquirer), 20: real image arithmetic processing unit (real image arithmetic processor), 21: face part point extracting unit (face part point extractor), 22: pupil position detecting unit (pupil position detector), 30: three-dimensional model superimposition processing unit (three-dimensional model superimposition processor), 31: three-dimensional position and posture estimating unit (three-dimensional position and posture estimator), 32: three-dimensional model correcting unit (three-dimensional model corrector), 32B: eyeball position correcting unit (eyeball position corrector), 33: three-dimensional eyeball position estimating unit (three-dimensional eyeball position estimator), 40: line-of-sight angle calculating unit (line-of-sight angle calculator), 100: arithmetic processing unit (arithmetic processor).

The invention claimed is:

1. An eye tracker comprising:

an image acquirer to acquire an image of a subject;

an arithmetic processor to perform image processing; and a line-of-sight angle calculator to calculate a line-of-sight direction vector by referring to a result of the image processing, wherein the arithmetic processor includes: a real image arithmetic processor to perform arithmetic processing on a real image in an image space; and a three-dimensional model superimposition processor to perform superimposition processing on the image space using a three-dimensional face model, and the three-dimensional model superimposition processor includes an eyeball position corrector to estimate a direction of the pupil by referring to a distance from a nose point N to a pupil, the eyeball position corrector
- (processing A) coordinate-transforms a plurality of reference points defined on the three-dimensional face model to an image coordinate system,
- (processing B) corrects the position of a point A, which is one of the reference points, and defines as a point A',
- (processing C) decomposes a vector NA' connecting the nose point N and the defined point A' in an X-axis direction and a Y-axis direction, and
- (processing D) calculates a distance from the nose point N to the pupil position by referring to the decomposed Y-axis direction component of the vector NA', wherein, the X-axis direction in the image coordinate system is generally horizontal, and the Y-axis direction in the image coordinate system is generally vertical.

* * * * *